Figure 1:
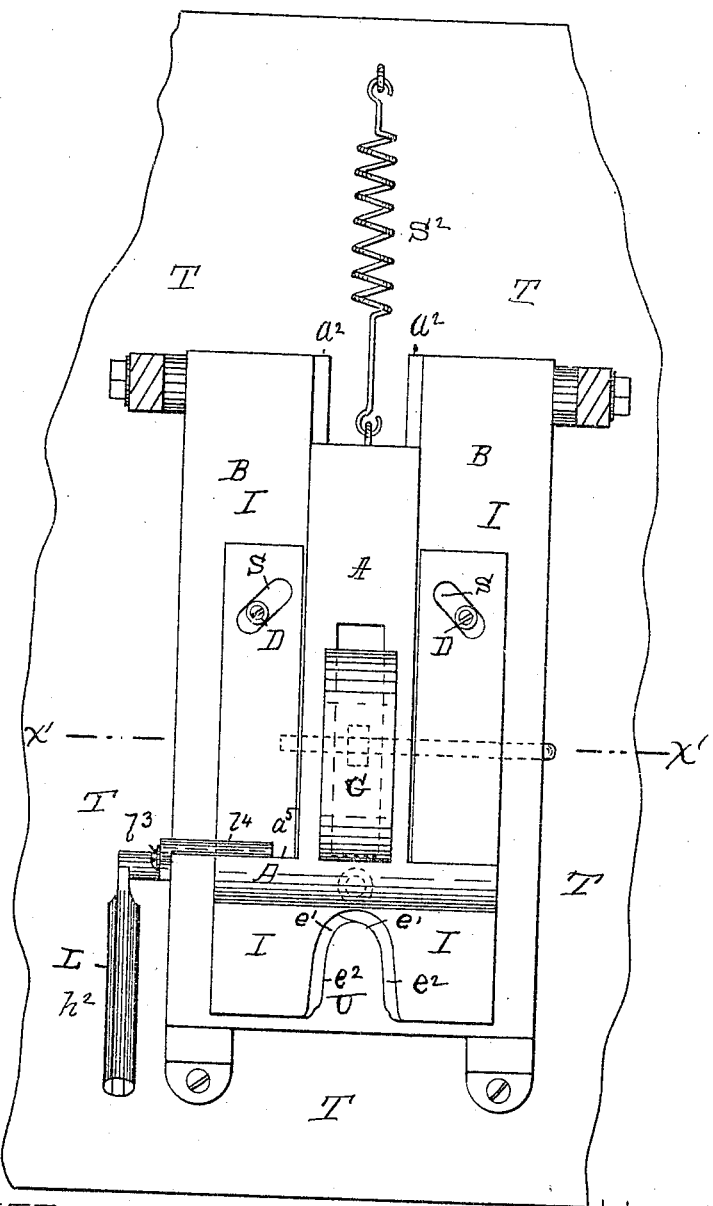

No. 837,500. PATENTED DEC. 4, 1906.
J. K. P. PINE & G. J. DORMANDY.
MACHINE FOR INFOLDING TAB BLANKS.
APPLICATION FILED JULY 7, 1902.

5 SHEETS—SHEET 1.

WITNESSES
Chas. Hagen
Charles S. Brintnall

INVENTORS
Garry J. Dormandy
James K. P. Pine
by W. E. Hagan Atty

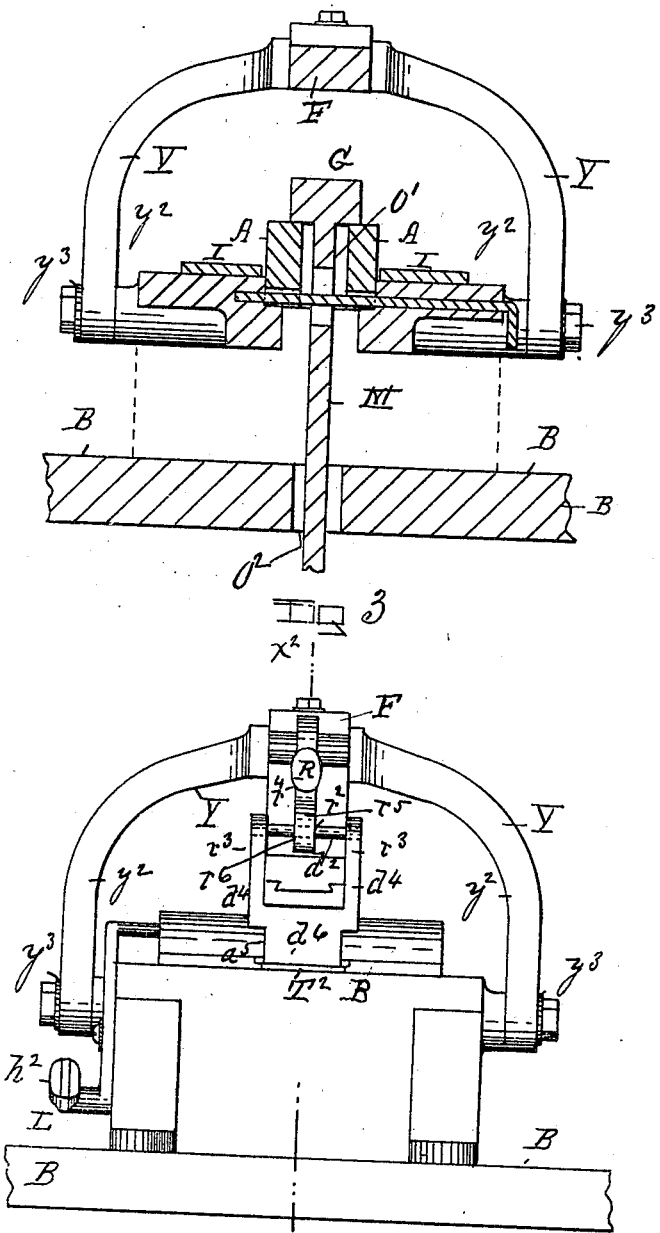

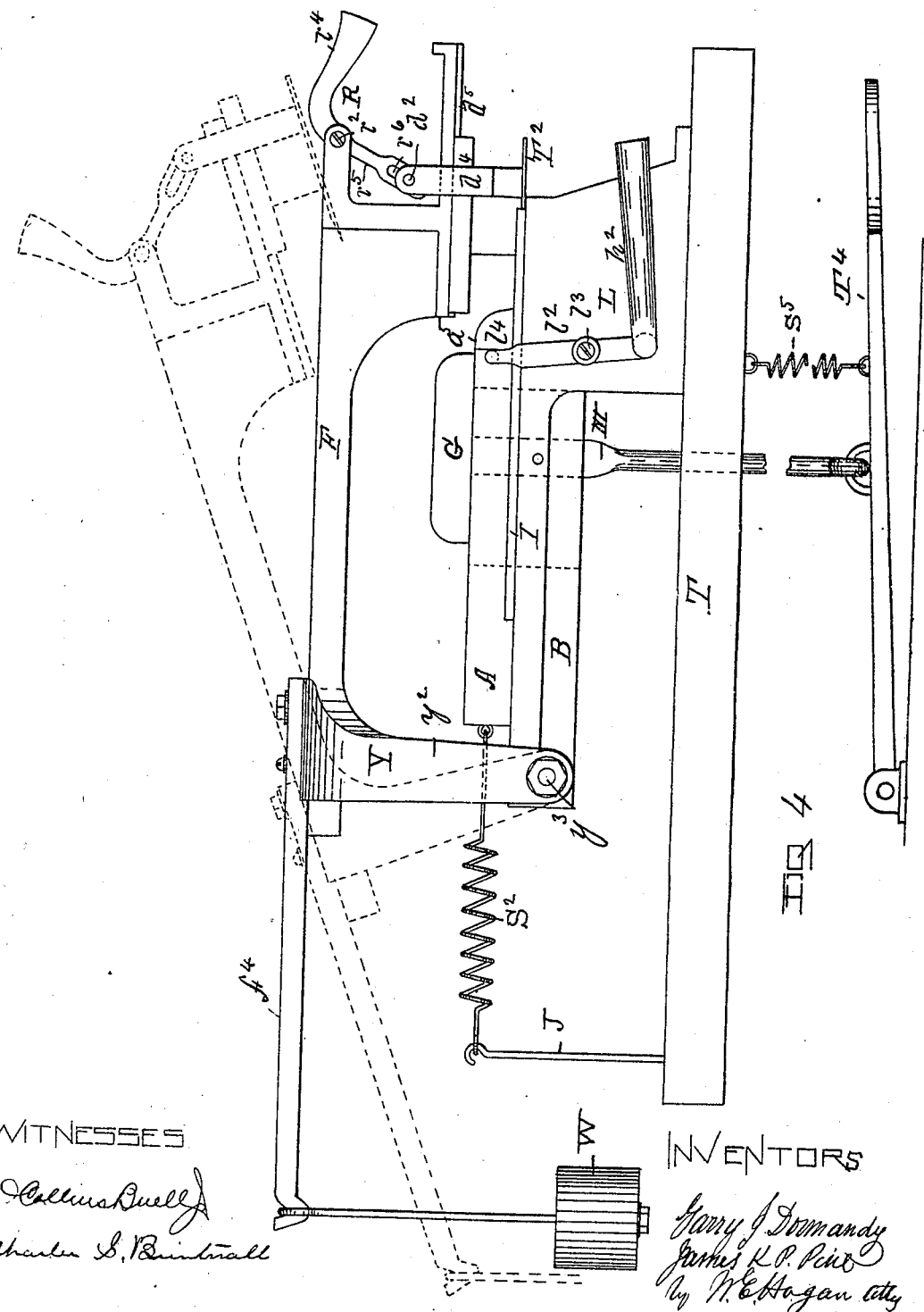

No. 837,500. PATENTED DEC. 4, 1906.
J. K. P. PINE & G. J. DORMANDY.
MACHINE FOR INFOLDING TAB BLANKS.
APPLICATION FILED JULY 7, 1902.
5 SHEETS—SHEET 4.
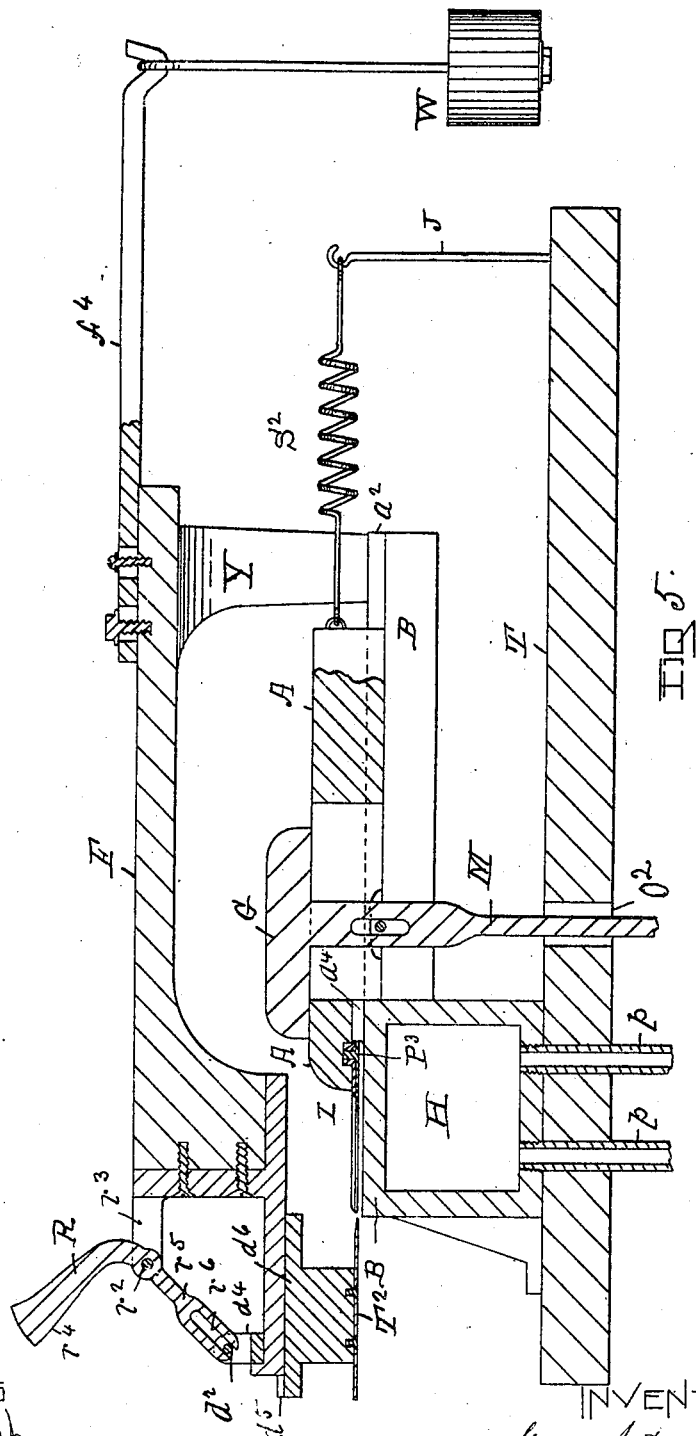

No. 837,500. PATENTED DEC. 4, 1906.
J. K. P. PINE & G. J. DORMANDY.
MACHINE FOR INFOLDING TAB BLANKS.
APPLICATION FILED JULY 7, 1902.
5 SHEETS—SHEET 5.
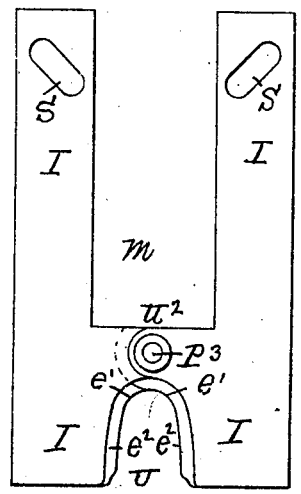
Fig 6
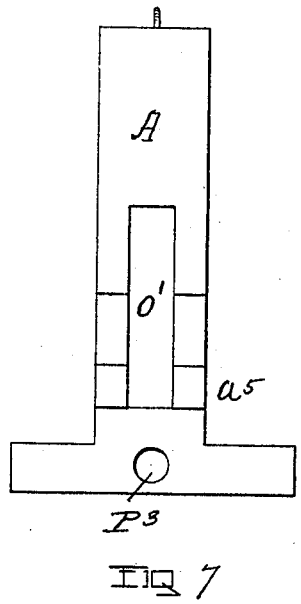
Fig 7
Fig 10
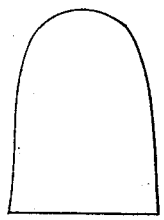
Fig 11
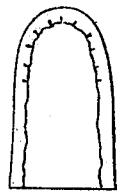
Fig 8
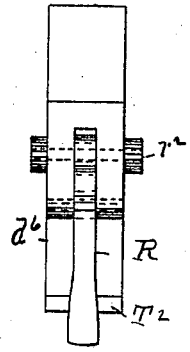
Fig 9
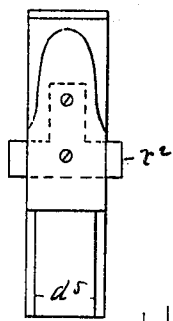
WITNESSES
INVENTORS

UNITED STATES PATENT OFFICE.

JAMES K. P. PINE AND GARRY J. DORMANDY, OF TROY, NEW YORK, ASSIGNORS TO UNITED SHIRT & COLLAR COMPANY, OF TROY, NEW YORK.

MACHINE FOR INFOLDING TAB-BLANKS.

No. 837,500.  Specification of Letters Patent.  Patented Dec. 4, 1906.

Application filed July 7, 1902. Serial No. 114,558.

*To all whom it may concern:*

Be it known that we, JAMES K. P. PINE and GARRY J. DORMANDY, residents of the city of Troy, county of Rensselaer, and State of New York, have jointly invented new and useful Improvements in Machines for Infolding Tab-Blanks, of which the following is a specification.

Our invention relates, broadly, to folding-machines, and specifically to mechanism adapted to infold or inturn the edges of blanks such as used in the manufacture of apparel articles, particularly to that class of blanks from which are formed the tabs of bosom-shirts, shirtwaists, and other garments, it being a purpose of our invention to produce the infolds upon the edges of the blank with rapidity and to give greater uniformity to the folded tabs.

Accompanying this specification to form a part of it there are five plates of drawings containing nine figures illustrating one form of mechanism embodying our invention, with the same designation of parts by letter reference used in all of them.

Of the illustrations, Figure 1 is a top view of a machine containing our invention with the infolders shown as resting upon the bed and with the templet and templet-operating parts removed. Fig. 2 is a front end elevation of the machine shown in Fig. 1. Fig. 3 is a cross-section taken on the line $x'$ $x'$ of Fig. 1. Fig. 4 is a side elevation of the machine shown in Fig. 1 with the part F and the templet carried by it shown in lower position by full lines and as partly raised by dotted lines. Fig. 5 is a vertical longitudinal section taken on the line $x^2$ $x^2$ of Fig. 2. Fig. 6 shows a detached view of the infolders of Fig. 1, and Fig. 7 a bottom view of the bar A on which the infolders are mounted. Fig. 8 is a detail top view of the bell-crank lever R, slide-plate $d^6$ connected therewith, and the templet $T^2$ of Figs. 2 and 4. Fig. 9 is a view of the under side of the plate on which the templet is mounted, showing also the templet. Fig. 10 is a plan view of the blank before being infolded, and Fig. 11 is a plan view of one of the blanks after having been infolded.

The several parts of the apparatus thus illustrated are designated by letter reference, and the function of the parts is described as follows:

The letter T designates a convenient form of table or platform upon which to mount a machine.

B designates the bed of a machine embodying our invention, whereon at the front blanks may be placed to be infolded.

H designates a chamber which may be formed in the bed B beneath that part of the latter upon which the blanks to be infolded are supported, and the letters $p$ $p$ designate two pipes whereby steam may be caused to circulate in said chamber to heat that portion of the bed whereon the blanks are infolded to assist in firmly fixing the infolds formed on the blanks.

A designates a T-form bar adapted to be moved forwardly and backwardly as by means of slides $a^2$, formed for convenience in the bed B, as illustrated at Figs. 1 and 5.

Letters I I designate two infolders, shown as plates, and which are cut away interiorly to inclose an area $m$ occupied by the bar A. These infolder-plates I I are made to lap past each other at $u^2$, and where thus lapping past each other they are pivoted to each other by being together pivoted to the under side of the bar A at $P^3$.

The specific form of machine being described is adapted for operating upon blanks whose folded edges will be U-shaped. For this purpose the infolders are shaped to afford curved edges $e'$ $e'$ and edges $e^2$ $e^2$ to produce when comibned a U-form area U, which the infolders as thus cut away inclose. Each infolder has formed at its rear end a slot S, arranged to have a cam action (this being a convenient infolder oscillating means) with pins D, fixed at either side of the bed B, and provided, when desired, with rollers. As thus arranged, when the bar A and connected infolder-plates I are together moved frontwardly the infolding edges of the plates will be moved both frontwardly and at the same time by the cam action described moved inwardly, thus causing the side infolding edges $e^2$ $e^2$ of the plates I I to be moved toward each other by reason of the oscillation of the infolders.

L designates a bell-crank lever, comprising an operating-handle $h^2$ and an arm $l^2$, that is pivoted to the side of the bed at $l^3$, and its upper end $l^4$ extended horizontally to engage with and bear upon the rear vertical face of the left-hand extension $a^5$ of the bar A, as illustrated in Figs. 1 and 4.

The letter $S^2$ designates a spring, connected at the rear with a vertical standard J and at the front with the bar A to pull the latter rearwardly and resist the operation of the handle $h^2$ when the latter is pressed downwardly to move the bar A and connected infolder-plates I I frontwardly.

We will now describe a preferable form of templet and operating mechanism therefor.

F designates an oscillating member, which at its rear end is overbalanced by a weight W, depending from the rear extension $f^4$ of the member F. A yoke Y carries the member F and is pivotedly supported by its two arms $y^2$ $y^2$ to the bed at $y^3$ $y^3$. R designates another bell-crank lever, which at $r^2$ is pivoted to extensions $r^3$ of the member F, and lever R is provided with an operating-handle $r^4$ and having its downwardly-extended arm $r^5$ arranged between two posts $d^4$ $d^4$ and its slot $r^6$ engaging a pin extending from post to post, as illustrated at Figs. 2, 4, and 5. These posts each connect at their lower end to a slide-plate $d^6$, arranged in a guide or slide $d^5$, and depending from said slide-plate there is arranged a templet-stock, secured to which is the templet-plate or templet proper, $T^2$, as shown at Figs. 2, 4, and 5. As thus constructed, by operating the lever R by depressing the outer end of its handle the templet $T^2$ is moved inwardly or backwardly in proper position to rest upon a blank placed on the bed. When the member F is pressed downwardly on its pivotal connection against the action of the weight W, the templet $T^2$, being in the rearward position of Fig. 4, the latter will in operation be brought to bear directly upon the blanks upon the bed and within edge portions of the blanks. With the parts thus placed the lever L may be next lowered to move frontwardly the bar A and connected infolder-plates I I. The forward movement of the infolder edges $e'$ $e'$ effects the infolding of the corresponding part of the tab-blank, and the swinging motion of the edge portions $e^2$ $e^2$ of the infolder-plates carries the remaining edges of the blanks to be infolded over other edge portions of the templet to form infolds. After the infolds thus formed have been pressed in any well-known manner, or as will be hereinafter particularly described, the pressure upon the pivoted lever L is removed and the bar A and infolders I I are drawn rearwardly by the action of the spring $S^2$, and the member F by the action of the counterpoise is caused to rise and is put in suitable position for a new operation.

We will now describe a convenient pressing mechanism.

G designates a presser-head or presser arranged to bear downwardly upon the bar A by means of a connecting-rod M, that extends through openings O' and $O^2$ in the bar A, and the table T, respectively, to a suitable treadle device $T^4$, the latter provided with suitable spring $S^5$ to restore the treadle and presser to normal position after a pressing operation. Obviously on lowering the treadle following an infolding operation and preferably after the templet is withdrawn from the folds, but before the blanks are disturbed and before the infolders are withdrawn, the presser G through the bar A will effect a squeezing of the folds of the blanks between the infolders and the heated bed to fix the folds with a sharp crease.

We do not limit our invention as herein set forth and described to the infolding of the particular form of blanks illustrated, nor to any specific details where the same may be changed without departing from the spirit of our invention.

Having thus described a machine embodying our invention, what we claim, and desire to secure by Letters Patent, is—

1. In a folding-machine the combination of a support for the blanks to be infolded, a templet having edge portions adapted to bear directly upon the blanks upon said support, and within edge portions of the blanks, mechanism for carrying the said templet to permit an upward and downward movement thereof, and infolding mechanism comprising a to-and-fro moving bar, two swinging infolders mounted on said bar, means for effecting the to-and-fro movements of the said bar and the connected infolders, and means for swinging said infolders at the same operation with their to-and-fro movements, for substantially the purposes set forth.

2. In a folding-machine, a blank-support, a templet, means for moving said templet toward and from said support and also in the plane of said support, pivotally-connected infolders, means for moving said infolders simultaneously over an end and the sides of said templet to fold the edges of the blank thereover by a single movement, and mechanism coöperating with said support and said infolders for pressing the folded edges of the blank before the removal of the blank from said support.

3. In a folding-machine for tab-blanks or the like the combination of a support for the blanks to be infolded, a vertically-swinging member for positioning a templet upon the blanks upon said support, a templet fitted to slide on the free end of said swinging member, whereby it may be moved outwardly to withdraw it from the folded edges of the blanks, and swinging infolders mounted on a to-and-fro moving part or bar, and adapted to be moved toward the templet upon the blanks and simultaneously swing toward each other to fold at once the edges of the blanks excepting that edge from which the templet is to be withdrawn, and a presser for fixing the folds of the blanks by pressure between the support and infolders, before the latter have been moved outwardly, for substantially the purposes set forth.

4. In an infolding-machine, the combination with a bed, of a templet adapted to descend and move inwardly to rest upon a blank placed upon said bed while being infolded, and then to draw frontwardly from off the blank, mechanism for effecting said movements of the templet, a bar, slideways in the bed in which said bar moves forwardly and rearwardly, infolder-plates arranged to lap past each other and be pivoted to the under side of said bar with the lapping parts of said infolder-plates where subtending said bar, and in front of where pivoted, cut away on their inside edges to form infolders, means substantially as described whereby said bar and infolder-plates may be moved frontwardly and have their infolder edges operated to carry the end and side edges of the blank over the templet edges and means for forcing said infolder-plates down upon the blank to press the same after the withdrawal of said templet, substantially as and for the purposes set forth.

5. In an infolding-machine, the combination with a bed, of a templet adapted to be moved inwardly, descend and rest upon a blank placed upon said bed, and in sequence to move outwardly and rise from off the bed, mechanism for effecting said movements of the templet, infolder-plates arranged to lap past each other and be pivotally connected, and in front of where pivoted to have infolders formed on their inner edges, means substantially as described whereby said infolder-plates may be moved frontwardly with their infolder edges actuated to carry the end and side edges of the blank over the templet edges where resting thereon and means for forcing said infolder-plates down upon the blank to press the same after the withdrawal of said templet, substantially for the purposes set forth.

6. In an infolding-machine, the combination with a bed, of a templet provided with means substantially as described whereby it will be operated to descend, move inwardly to rest upon a blank being infolded on said bed and then to rise therefrom, a bar having slides in said bed, infolder-plates arranged to lap past each other and to be pivoted to the under side of said bar, with the lapping parts of the infolders where subtending said bar, frontwardly and in advance of their pivot cut away on their inside edges to form infolders, a slot in each of said infolder-plates arranged obliquely to the side edges of the latter and to be obtusely angular to each other, a slide-pin projected from the bed to enter each of said slots, means substantially as described whereby when said bar is moved frontwardly the infolder-plates at their infolder edges will be operated to carry the subtending edges of the blank over the templet edges and means for forcing said infolder-plates down upon the blank to press the same after the withdrawal of said templet.

7. In an infolding-machine, the combination with a bed, of a templet having means for causing it to descend, move inwardly and rest upon a blank placed on the bed, and in sequence to move outwardly before rising therefrom, a bar provided with slides in the bed, infolder-plates arranged to lap past each other and thereat be pivoted to said bar, and in front of their pivotal connection provided with infolding edges, means substantially as described whereby said bar and infolder-plates may be moved frontwardly and their infolder edges actuated to carry the edges of the blank over the edges of the templet when resting thereon, and a presser arranged to descend upon said bar so as to apply pressure to the infolds after the templet has been drawn therefrom, substantially as and for the purposes set forth.

8. The combination with the bed B having the slides $a^2$ $a^2$ and the slide-pins D D upwardly projected therefrom, of the T-form bar A having a transversely-cut-away part $a^4$ and the spring $S^2$, the infolder-plates I, I each cut away interiorly at $m$, provided with a slot S and arranged to lap past each other and to be together pivoted to the bar A, and in front of where pivoted provided with infolder edges $e'$ and $e^2$ $e^2$, the bell-crank lever L, the frame part F hinged to the bed at $y^3$, having the counterpoise W, and the templet $T^2$ provided with the operating bell-crank lever R, constructed and arranged to be operated substantially as and for the purposes set forth.

9. In a folding-machine, a bed, two pivotally-connected infolder-plates having edges coöperating to fold two sides and an end of a blank, means for simultaneously moving said infolders both forwardly and toward each other, and means for forcing said infolders integrally downward upon a blank on said bed.

10. In a folding-machine, a bed, two pivotally-connected infolder-plates having edges coöperating to infold two sides and an end of a blank, means for moving said infolders both forwardly and toward each other, a templet, and means for moving said templet both in a plane parallel with said bed and toward and from said bed.

11. In a folding-machine, a bed, two pivotally-connected infolder-plates having edges coöperating to infold two sides and an end of a blank, a templet, means for moving said templet toward said bed, means for moving said infolders both forwardly and toward each other over the edges of said templet, means for moving said templet from beneath said infolder-plates in a plane parallel with said bed and from said bed, and means for forcing said infolders downward upon said bed, all said means being constructed or fitted to be operated in the order named.

Signed at the city of Troy, New York, this 7th day of June, 1902, in the presence of the two witnesses whose names are hereto written.

JAMES K. P. PINE.
GARRY J. DORMANDY.

Witnesses:
  E. O. House,
  E. H. House.